(12) United States Patent
Wheelock et al.

(10) Patent No.: US 11,346,968 B2
(45) Date of Patent: May 31, 2022

(54) ESTIMATION OF RESERVOIR FLOW PROPERTIES FROM SEISMIC DATA

(71) Applicant: ExxonMobil Technology and Engineering Company, Annandale, NJ (US)

(72) Inventors: Brent D. Wheelock, Morristown, NJ (US); Mehmet D. Ertas, Bethlehem, PA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 195 days.

(21) Appl. No.: 16/708,710

(22) Filed: Dec. 10, 2019

(65) Prior Publication Data

US 2020/0233111 A1 Jul. 23, 2020

Related U.S. Application Data

(60) Provisional application No. 62/793,966, filed on Jan. 18, 2019.

(51) Int. Cl.
*G01V 1/30* (2006.01)
*E21B 49/00* (2006.01)
*G01V 1/28* (2006.01)

(52) U.S. Cl.
CPC .............. *G01V 1/306* (2013.01); *E21B 49/00* (2013.01); *G01V 1/282* (2013.01)

(58) Field of Classification Search
CPC ......... G01V 1/306; G01V 1/282; E21B 49/00
See application file for complete search history.

(56) References Cited

U.S. PATENT DOCUMENTS 6,302,221 B1 * 10/2001 Hamman ............... G01V 1/306
175/50
7,072,767 B2 * 7/2006 Routh ....................... G01V 1/28
702/14

(Continued)

FOREIGN PATENT DOCUMENTS

WO 2014011784 1/2014
WO WO-2014011784 A2 * 1/2014 ............... G01V 1/30

OTHER PUBLICATIONS

B.L.N. Kennett and N. J. Kerry, "Seismic waves in a stratified half space", Geophys. J. R. astr. Soc. (1979) 57, 557-583.

(Continued)

*Primary Examiner* — Manuel A Rivera Vargas
*Assistant Examiner* — Yaritza H Perez Bermudez
(74) *Attorney, Agent, or Firm* — Scott F. Yarnell

(57) ABSTRACT

A method and apparatus for identifying non-elastic indicators for a subsurface region, the method including obtaining seismic data for the subsurface region; generating a best-fit elastic model from the seismic data; and identifying non-elastic indicators from the seismic data and the best-fit elastic model. The method and apparatus may also include estimating reservoir flow properties from the non-elastic indicators based on a poroelastic interpretation of the seismic response. The method and apparatus may also include subdividing the seismic data into a plurality of subdivisions, wherein: generating the best-fit elastic model from the seismic data includes generating an individual best-fit elastic model for each subdivision; identifying non-elastic indicators from the seismic data and the best-fit elastic model includes identifying individual non-elastic indicators from each subdivision and its respective individual best-fit elastic model; and estimating the reservoir flow properties from the (Continued)

non-elastic indicators comprises analyzing the individual non-elastic indicators based on the subdivisions.

24 Claims, 16 Drawing Sheets

(56) References Cited

U.S. PATENT DOCUMENTS

| | | | |
|---|---|---|---|
| 10,067,264 | B2 | 9/2018 | Blanchard et al. |
| 2011/0090760 | A1* | 4/2011 | Rickett ................. G01V 1/282 367/73 |
| 2016/0116637 | A1* | 4/2016 | Blanchard ............. G01V 1/306 703/2 |
| 2018/0143336 | A1* | 5/2018 | Bornard ................ G01V 1/282 |
| 2020/0096663 | A1* | 3/2020 | Shetty ..................... G01V 3/18 |
| 2021/0080573 | A1* | 3/2021 | Bachmann ........... G01N 29/262 |

OTHER PUBLICATIONS

Steven C. Constable, Robert L. Parker, and Catherine G. Constable, "Occam's Inversion: A practical algorithm for generating smooth models from electromagnetic sounding data", Geophysics, vol. 52, No. 3 (Mar. 1987), pp. 289-300.

Tobias M. Muller, Boris Gurevich, and Maxim Lebedev, "Seismic wave attenuation and dispersion resulting from wave-induced flow in porous rocks—A review", Geophysics, vol. 75, No. 5 (Sep.-Oct. 2010), pp. 75A147-75A164.

* cited by examiner

ESTIMATION OF RESERVOIR FLOW PROPERTIES FROM SEISMIC DATA

CROSS-REFERENCE TO RELATED APPLICATIONS

This application claims the benefit of U.S. Provisional Application No. 62/793,966, filed on Jan. 18, 2019, the disclosure of which is incorporated herein by reference in its entirety.

FIELD

This disclosure relates generally to the field of geophysical prospecting and, more particularly, to prospecting for hydrocarbon and related data processing. Specifically, exemplary embodiments relate to methods and apparatus for improving computational efficiency by extracting intrinsic attenuation from seismic data for estimation of reservoir flow properties.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately detect, locate, identify, model, and/or quantify subsurface structures and likelihood of hydrocarbon occurrence. For example, seismic data may be gathered and processed to generate subsurface models. Seismic prospecting is facilitated by acquiring raw seismic data during performance of a seismic survey. During a seismic survey, one or more seismic sources generate seismic energy (e.g., a controlled explosion, or "shot") which is delivered/propagated into the earth. Seismic waves are reflected from subsurface structures and are received by a number of seismic sensors or "receivers" (e.g., geophones). The seismic data received by the seismic sensors is processed in an effort to create an accurate mapping (e.g., an image) of the subsurface region. The processed data is then examined (e.g., analysis of the mapping) with a goal of identifying geological structures that may contain hydrocarbons.

The profitability of an oil reservoir generally depends on both the quantity of hydrocarbons contained therein and the flow quality of the reservoir—how readily hydrocarbons will flow out of the subsurface formations and into a well. Flow quality may be related to flow properties, including rock matrix permeability (absolute or objective permeability), permeability by entrained fluid type (relative permeability), and the viscosities of the reservoir fluid(s). The flow properties of a reservoir may be assessed by inducing relative motion between the reservoir fluid and the formation. Relative motion may be induced, for example, by managing pressures of and/or through a well which penetrates the reservoir of interest. However, induced relative motion may only apply a force on the fluid originating from a small number of lateral points per well, diminishing the resulting spatial resolution of the estimated flow properties. Moreover, assessing flow properties may be even more challenging when there is no well providing a direct hydraulic connection to the reservoir.

Currently, there are very few ways to infer flow properties of a reservoir remotely, that is, where instrumentation remains above the earth's surface. Under certain conditions, relative flow between the rock matrix and the entrained fluids can be induced by seismic energy. For example, seismic energy within a frequency range of about 2 Hz to about 200 Hz may induce relative flow in the form of a non-elastic response between two elastic limits. The high frequency elastic limit is believed to be due to the fact that fluid flow in the pores does not have time to equilibrate between adjacent layers of differing rock. The low frequency elastic limit is believed to be due to the fact that fluid flow quickly equilibrates. The relative flow may then be detected with seismic receivers at the surface. For example, the relative flow may affect the amplitude and/or phase of the seismic energy as a function of frequency. The seismic frequency response can then be measured at the earth's surface and used to infer flow properties of the reservoir at depth.

As discussed in co-pending U.S. Provisional Patent Application Ser. No. 62/634,241, filed Feb. 23, 2018, the flow properties of fluid-filled porous media may give rise to dispersion and attenuation effects in the seismic response, which make the response moduli complex functions of frequency. For such media, the reflectivity spectrum may acquire additional, intrinsic frequency dependence (e.g., dispersion and attenuation effects) beyond elastic interference effects (where all the moduli are real functions of frequency). Intrinsic attenuation effects (e.g., wave-induced fluid flow (WIFF)) may be distinguished from elastic interference (e.g., scattering attenuation effects) by fitting arbitrary analytic basis functions (e.g., an integer power series of frequency) to the complex reflectivity spectrum of migrated seismic data focused around a target horizon. These analytic basis functions may serve as a proxy for the physics of the problem. The reservoir's elastic (flow-independent) parameters may be estimated, converted to static and/or flow-independent variables (e.g., porosity and rock type), and finally, through an empirically-derived rock-sample calibration (e.g., utilizing an appropriate rock physics model), the static variables may be converted to dynamic flow variables. However, this method utilizes physical acquisition of an analogous rock ("core") sample for calibration, and/or extensive pre-processing of seismic data to remove dispersion and attenuation effects and focus on a specific horizon. Moreover, the flow properties are not directly related to the physical phenomena, but are inferred and estimated through a hypothetical rock physics model, which may induce error into the result.

Methods beyond current seismic processing methods are needed to determine reservoir flow properties without the benefit of a direct hydraulic connection to the reservoir.

SUMMARY

In a class of embodiments, the invention is directed to a method of identifying non-elastic indicators for a subsurface region, comprising: obtaining seismic data for the subsurface region; generating a best-fit elastic model from the seismic data; and identifying the non-elastic indicators from the seismic data and the best-fit elastic model.

In another class of embodiments, the invention is directed to a method for generating an image of a subsurface region comprising: obtaining seismic data for the subsurface region; generating a best-fit elastic model from the seismic data; identifying non-elastic indicators from the seismic data and the best-fit elastic model; and generating the image from the non-elastic indicators.

In yet another class of embodiments, the invention is directed to a method of hydrocarbon management comprising: obtaining seismic data for the subsurface region; generating a best-fit elastic model from the seismic data; identifying non-elastic indicators from the seismic data and the best-fit elastic model; and making a well-placement decision based on the non-elastic indicators.

In a class of embodiments, the invention is directed to geophysical data analysis system comprising: a processor; and a display configured to display graphical representations of a geophysical data set, wherein the processor is configured to: obtain seismic data for the subsurface region; generate a best-fit elastic model from the seismic data; and identify non-elastic indicators from the seismic data and the best-fit elastic model.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

FIG. 5A illustrates a low permeability example. FIG. 5D illustrates a moderate permeability example. FIG. 5B illustrates the misfit per iteration of the example from FIG. 5A. FIG. 5E illustrates the misfit per iteration of the example from FIG. 5D. FIG. 5C illustrates the residuals of the example from FIG. 5A. FIG. 5F illustrates the residuals of the example from FIG. 5D.

DETAILED DESCRIPTION

Figure 1:
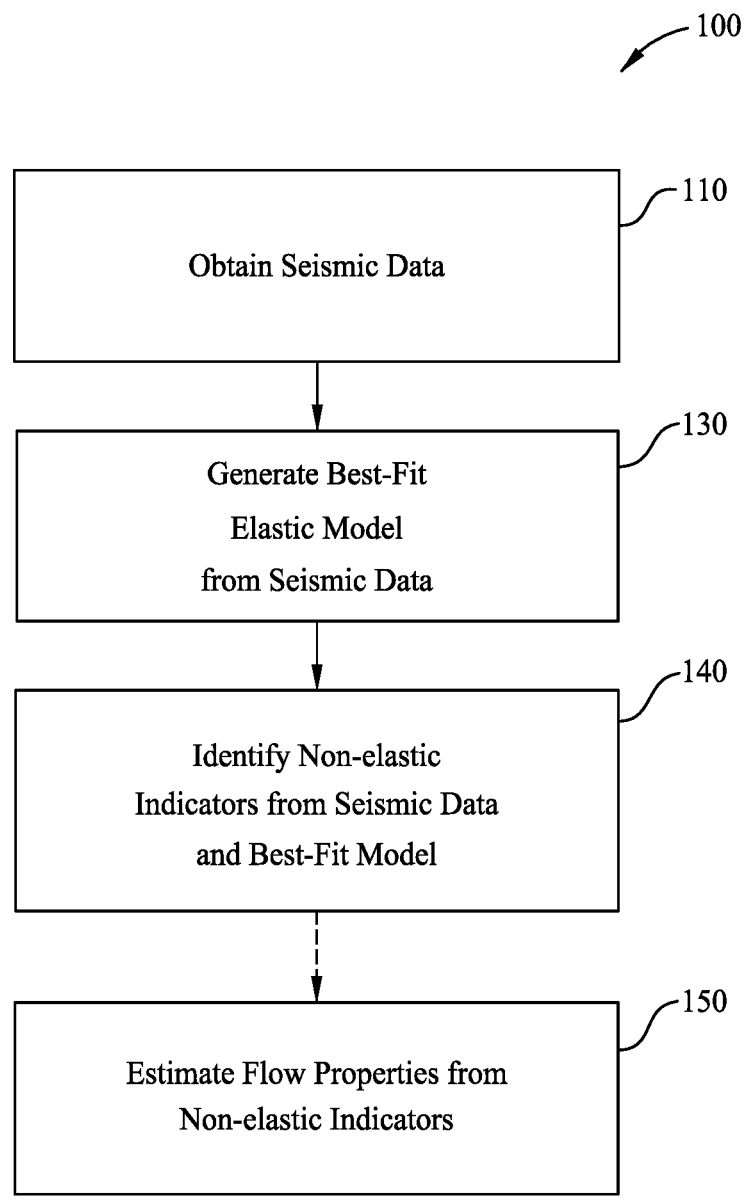
FIG. 1 illustrates a method of estimating reservoir flow properties from seismic data.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the overall operation. As another example, the two or more events may occur during time periods that overlap by about 40% to about 100% of either period.

The term "seismic data" as used herein broadly means any data received and/or recorded as part of the seismic surveying process, including particle displacement, velocity, and/or acceleration, pressure, rotation, reflection, shear, and/or refraction wave data. "Seismic data" is also intended to include any data or properties, including geophysical properties such as one or more of: elastic properties (e.g., P and/or S wave velocity, P-Impedance, S-Impedance, density, attenuation, anisotropy, and the like); seismic stacks (e.g., seismic angle stacks); compressional velocity models; and porosity, permeability, or the like, that the ordinarily skilled artisan at the time of this disclosure will recognize may be inferred or otherwise derived from such data received and/or recorded as part of the seismic surveying process. Thus, the disclosure may at times refer to "seismic data and/or data derived therefrom," or equivalently simply to "seismic data." Both terms are intended to include both measured/recorded seismic data and such derived data, unless the context clearly indicates that only one or the other is intended.

The term "geophysical data" as used herein broadly includes seismic data, as well as other data obtained from non-seismic geophysical methods, such as electrical resistivity.

The terms "velocity model," "density model," "physical property model," or other similar terms as used herein refer to a numerical representation of parameters for subsurface regions. Generally, the numerical representation includes an array of numbers, typically a 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model may be represented in volume elements (voxels), in a similar way that a photograph is represented by picture elements (pixels).

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations (e.g., estimating reservoir flow properties thereof); identifying well placement locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.).

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries. For example, a seismic survey may be conducted to acquire the initial data (noting that these and other embodiments may also or instead include obtaining other geophysical data in addition or, or instead of, seismic data—such as obtaining electrical resistivity measurements). In these and other embodiments, models may be utilized to generate synthetic initial data (e.g., computer simulation). In some embodiments, the initial data may be obtained from a library of data from previous seismic surveys or previous computer simulations. In some embodiments, a combination of any two or more of these methods may be utilized to generate the initial data.

As used herein, "offset" refers to a distance between a source and a receiver. "Midpoint" refers to a location on the axis between a source and a receiver that is approximately half-way between the source and the receiver. During a seismic survey, the number of recorded offsets typically has to do with the uniqueness of locations in the receiver array. New shots (sources) may be taken by moving the whole source-receiver-array as a fixed geometry combination. Thus, as the whole array moves during a survey, the number of offsets do not normally change. Midpoints, on the other hand, are absolute locations related to the ground coordinates. As the source-receiver-array moves during a survey, the number of midpoint (locations) increases.

As used herein, a "gather" refers to a display of seismic traces that share an acquisition parameter. For example, a common midpoint gather contains traces having a common midpoint, while a common shot gather contains traces having a common shot.

As used herein, "inversion" refers to any process whereby, for a quantity y known to depend on one or more variables x (e.g., collectively forming a model m(x)), the specific values of x (or the specific model m(x)) are inferred to correspond to measured values of y. For example, a model may be derived from field data to describe the subsurface that is consistent with acquired data. For example, seismic inversion may refer to calculating acoustic impedance (or velocity) from a seismic trace, taken as representing the earth's reflectivity.

If there is any conflict in the usages of a word or term in this specification and one or more patent or other documents that may be incorporated herein by reference, the definitions that are consistent with this specification should be adopted for the purposes of understanding this disclosure.

It should be understood that, when there is relative flow between a formation and the entrained fluid, the propagation of seismic energy therethrough may not be accurately described by elastic equations of motion. When the relative fluid flow is appreciable, the propagation of seismic energy is more accurately described by poroelastic equations. For example, such elastic and poroelastic equations may be found in U.S. Provisional Patent Application Ser. No. 62/634,241, filed Feb. 23, 2018 (the disclosure of which is incorporated herein by reference). Certain poroelastic phenomena (observed in a seismic frequency response) cannot be replicated by a model that is restricted to purely elastic physics. Embodiments disclosed herein may first seek a replication of seismic observations using only elastic physics, and then use parts of the seismic signal which cannot be reproduced by the "best-fit" elastic model as indicators of non-elasticity in the subsurface formation. Preferably, these non-elastic indicators may be interpreted as originating from poroelasticity, and further used to infer areas of a reservoir which may have certain flow properties.

One of the many potential advantages of the embodiments of the present disclosure is directly inferring relative fluid flow, and/or rate of relaxation, through a subsurface formation. For example, embodiments of the present disclosure do not require initial inferences and/or estimations of physical phenomena through a hypothetical rock physics model (e.g., porosity, clay, and/or permeability models). Another potential advantage includes more efficient computer operations by minimizing or eliminating preprocessing of seismic data. Another potential advantage includes results that may densely resolve reservoir flow properties. For example, embodiments of the present disclosure may use many seismic source locations, rather than a single or relatively few wells accessing the reservoir. Embodiments of the present disclosure can thereby be useful in the discovery and/or extraction of hydrocarbons from subsurface formations. For example, better knowledge of flow properties may lead to better decisions about well placement and/or reservoir management, leading to less-costly extraction of hydrocarbons.

FIG. 1 illustrates a method 100 of estimating reservoir flow properties from seismic data. Method 100 may distinguish between scattering attenuation effects (of purely elastic materials) and intrinsic attenuation effects (indicators of non-elastic behavior, such as poroelasticity) in the seismic data by utilizing simulation techniques to find a best-fit model that represents purely elastic effects.

Method 100 begins at block 110 where the seismic data is obtained. For example, raw seismic data may be acquired from a seismic survey, synthetic seismic data may be generated from models, and/or prior seismic data may accessed from a library of data from previous seismic surveys or previous computer simulations. One or more sources may be deployed at or near the earth's surface above the subsurface region of interest. A plurality of receivers may also be deployed at or near the earth's surface, typically in an array that provides multiple different offsets relative to the one or more sources. For example, there may be between 1 and 10 sources, between 10 and 5000 receivers, and therefore possible offsets of between 10 and 5000. In some embodiments, the sources and/or the receivers may be configured to acquire low frequency data, such as between about 0.01 Hz and about 10 Hz. In some embodiments, the seismic data may include full-shot gathers or common-midpoint (CMP) gathers according to (1) source location, (2) receiver location, and/or (3) offset.

Method 100 continues at block 130 where simulation techniques are used to generate a best-fit elastic model from the seismic data. In some embodiments, the simulation techniques may include inversion techniques. In some embodiments, the simulation techniques may include using an elastic reflection simulation as a fitting function. For example, the fitting function may depend upon (as model variables) a stack of horizontal layers having only elastic characteristics. It should be appreciated that elastic reflection simulation as disclosed herein can reproduce the higher-order scattering effects (also known as internal multiples) of an arbitrary number of layers. Therefore, the seismic data (from block 110) does not need to be focused around a target horizon of interest, thereby reducing or eliminating the need for pre-processing. In some embodiments, the seismic data (from block 110) may only have noise abatement applied prior to utilizing the simulation techniques at block 130. In some embodiments, the seismic data is not migrated prior to utilizing the simulation techniques at block 130. It is currently believed that migrating the seismic data prior to utilizing the simulation techniques may attenuate poroelastic effects, thereby compromising the results of method 100. In some embodiments, the fitting function makes the seismic response a non-linear function with respect to its parameters (e.g., elastic velocity of each layer, density of each layer, and thicknesses of each layer). Therefore, a regularized, non-linear inversion may be applied to find the best-fit model of elastic layers which reproduced the seismic data. In some embodiments, the non-linear inversion may utilize a Jacobian matrix. The computation of the Jacobian matrix for the elastic seismic response may be analytically derived.

In some embodiments, the inversion at block 130 may account for the expected noise levels of the seismic data (e.g., noise as a function of source/receiver location, offset, frequency, and/or time). For example, the inversion may proceed through iterative improvement in the fit of the model prediction to the observed data until the total misfit meets the expected level of cumulative data error (noise). Advantageously, method 100 may account for the limited precision of any raw seismic data set when distinguishing elastic behavior (e.g., scattering attenuation) from non-elastic behavior (e.g., poroelastic attenuation). However, method 100 may only identify non-elastic behavior that deviates from elastic behavior above the expected noise level of the seismic data.

It should be appreciated that a variety of inversion techniques may be applicable at block 130. Suitable inversion techniques should be capable of fitting elastic models to elastic data with a low number of iterations and low residuals.

Method 100 continues at block 140 where residuals from the simulation, representing the degree to which the seismic data cannot be fit by the purely elastic best-fit model, may provide non-elastic indicators. In some embodiments, the level of misfit may be used as an indicator of non-elasticity. For example, level of misfit may be quantified as the root-mean-squares of the residuals, or some correlation coefficient of the residuals. In some embodiments, when the simulation techniques of block 130 include iterative techniques, the number of iterations that run prior to finding a best-fit model may be used as an indicator of non-elastic effects. In some embodiments, the non-elastic indicators may be used as a geologic attribute, and method 100 concludes.

In some embodiments, method 100 continues at block 150 where flow properties may be estimated from the non-elastic indicators, by interpreting these as originating from poroelastic effects. For example, a larger level of misfit may relate to higher amounts of wave-induced fluid flow (WIFF). Alternatively, a higher number of iterations in the elastic inversion may indicate more difficulty in finding an elastic model, and therefore a higher likelihood of WIFF. In some embodiments, the parameters of the fitting function (e.g., reflectivity coefficient, impedance, elastic velocity, density, and/or thickness of each layer) may be interpreted as indications of poroelastic effects. For example, WIFF may drive the best-fit elastic model to assume velocities or densities which are outside of geologic norms for the region of interest. In some embodiments, the difference or the root-mean-squared difference between the parameters of the fitting function and the expected parameters may be measured and/or aggregated to provide indicators of poroelastic effects.

In some embodiments, correlation among the level of misfit, the number of iterations, and the parameters may be an indicator of poroelasticity. For example, if two or three of these are indicative of poroelasticity, the likelihood of WIFF is higher than if only one of these points to poroelasticity.

In some embodiments, flow properties may be estimated from the non-elastic indicators and/or from poroelastic indicators through interpretation of spatial patterns and/or multi-point calibration. For example, spatial patterns in the scalar misfit map may be interpreted. In some embodiments, the interpretation may be done by comparison to spatial patterns from known reservoirs. For example, the spatial patterns may form geologic shapes similar to those typical of a known, good-flowing reservoir (e.g., a meandering channel). The interpretation may assign a given value of misfit—representative of a high reservoir flow—to spatial patterns with similar geologic shapes as the meandering channel. Likewise, spatial patterns in a misfit value may be similar to and/or indicative of a poor-flowing reservoir (e.g., the shape of a channel's over-bank deposit). The interpretation may assign a misfit value associated with poor reservoir quality to such spatial patterns.

As another example, flow properties may be estimated from comparison with points having known hydraulic probing results and/or physical samples. A ground truth of reservoir flow properties may be estimated at two or more lateral/depth location points having both seismic data and results from hydraulic probing and/or physical samples. Such points may be used to calibrate the metrics coming from the seismic data. From two such points, two values for reservoir flow properties (e.g., permeability) may be obtained. A relationship (e.g., linear relationship) may be estimated to convert a poroelastic indicator to a value of reservoir flow property. The conversion relationship may be utilized with the pervasive seismic dataset to extend the two-point measurements to a full dense map of reservoir flow properties.

Figure 2:
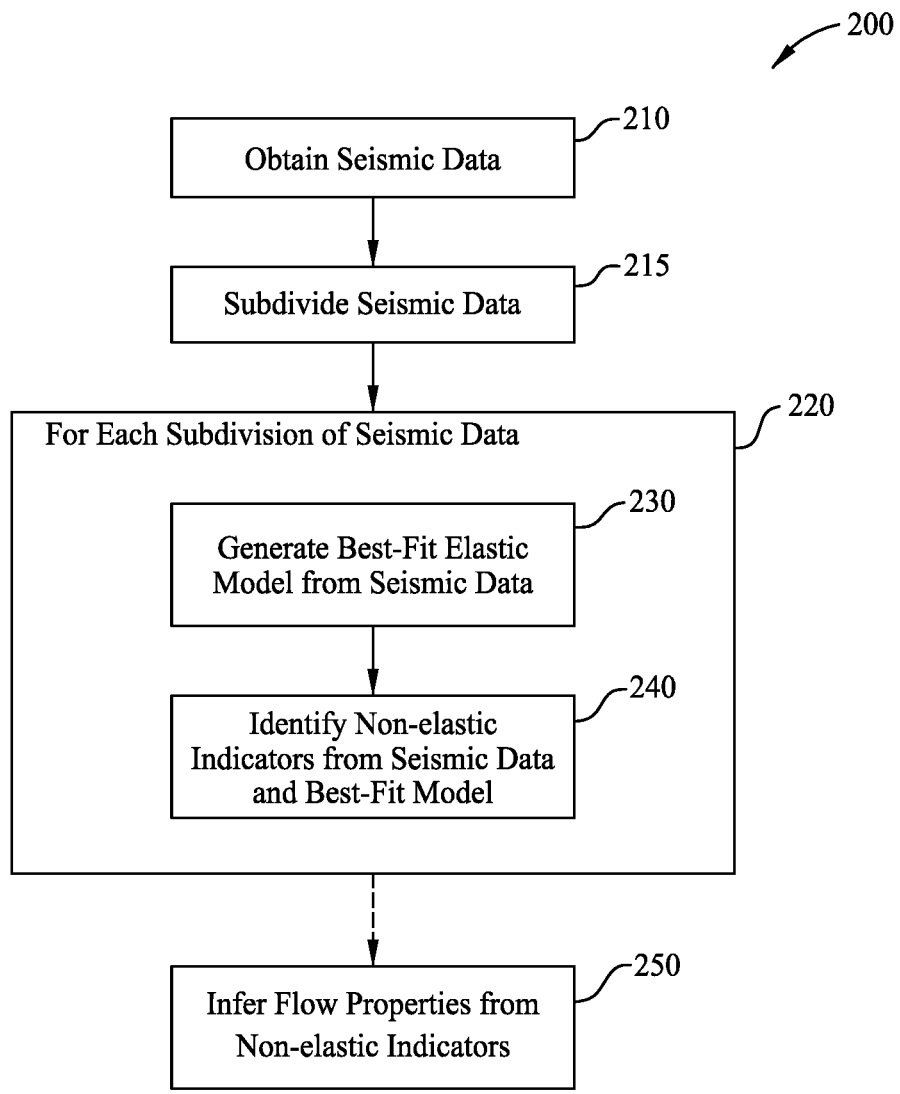
FIG. 2 illustrates another method of estimating reservoir flow properties from seismic data.

FIG. 2 illustrates another method 200 of estimating reservoir flow properties from seismic data. As with method 100, method 200 begins at block 210 where the seismic data is obtained. Unlike method 100, method 200 continues at block 215 where the seismic data is subdivided. For example, the seismic data may be subdivided by depth and/or lateral location (e.g., midpoint location). In some embodiments, each subdivision of the seismic data may be CMP gather data which pertains to a particular depth and lateral location. In some embodiments, each subdivision of the seismic data may be migrated trace data which pertains to a particular depth and lateral location. In some embodiments, each subdivision of data may represent a large number (between about 500 and about 50,000) of data points of the seismic data.

In some embodiments, subdividing the seismic data at block 215 may include isolating the seismic data by depths and lateral locations surrounding a prospective hydrocarbon reservoir. For example, the reservoir's seismic signature may be located in a migrated seismic reflectivity image. The signature may be subset such that all other seismic responses are zero in the migrated (subsurface) domain. The "subsetted" reflectivity responses may be migrated (e.g., reverse-time migration) back up to the plane of acquisition (location of the original sources and receivers). The locations of the subsetted reflectivity responses may be used in the source and receiver (and time) domain to isolate the raw seismic data which pertained to the reservoir of interest. The isolated raw (source/receiver domain) data pertaining to the reservoir may be extracted. Moreover, the isolated raw data may be used in gathers. For example, for each single source, receiver, or common-midpoint location, a gather (from the extracted data) of the relevant seismic traces may be made, and an elastic inversion may be performed.

Method 200 continues at block 220, where actions are repeated for data from each subdivision. For each subdivision of seismic data from block 215, method 200 continues at block 230 where simulation techniques are used to generate a best-fit elastic model from the subdivision of the seismic data (similar to block 130 of method 100). For each subdivision of seismic data from block 215, method 200 continues at block 240 where non-elastic indicators are identified from the residuals from the simulation (similar to block 140 of method 100).

The actions of block 220 for each subdivision may be run in parallel, sequentially, and/or in any order. Namely, the simulation techniques of block 230 may be run in parallel, sequentially, and/or in any order. Likewise, the identifications of block 240 may be run in parallel, sequentially, and/or in any order. However, in all instances, for any given subdivision, the simulation technique of block 230 should be run prior to the identification of block 240. In some embodiments, the non-elastic indicators may be used as a geologic attribute, and method 200 concludes.

In some embodiments, method 200 continues at block 250 where flow properties may be estimated from the non-elastic indicators, by interpreting these as originating from poroelastic effects. For example, residuals from the simulation (from block 230) and/or the non-elastic indicators (from block 240) for each subdivision (from block 215) may be plotted and/or analyzed based on the subdivisions (e.g., ordering, relative location, etc.). For example, a plot may be generated that presents the non-elastic indicators by subdivision depth and/or lateral location. In some embodiments, a user may review and/or interpret the plots. In some embodiments, a user may review and/or interpret the plots in a similar fashion as those skilled in the art would interpret a seismic attribute map as a means to assess spatial distribution of reservoir properties. In some embodiments, patterns (such as geologic shapes) and/or discontinuities may be identified (e.g., by a user, a program, machine learning, etc.) once the residuals and/or the non-elastic indicators are arranged by depth and/or lateral location. In some embodiments, the residuals may be migrated as part of the analysis. In some embodiments, the flow properties may be utilized to generate an image, make well placement determinations, and/or otherwise manage hydrocarbons.

In some embodiments, estimating flow properties from poroelastic indicators at block 250 includes producing and analyzing subsurface volume plots. For example, subsurface volume plots of inversion metrics (a scalar value plotted in x,y,z) may be produced. In some embodiments, residuals from inversion of the full data set, which are in the acquisition plane (in terms of source, receivers, and time coordinates), may be migrated down into the subsurface using an acoustic or elastic velocity model. In some embodiments, an inversion's 3D elastic model may be used on its own, or differenced with an expected subsurface 3D model, as a metric for the subsurface volume plot. In some embodiments, the depths and horizontal locations (sub-volume) of these metric models (which pertain to a prospective reservoir) may be isolated. Based on these plots, sub-volumes for flow properties may be interpreted.

Figure 3:
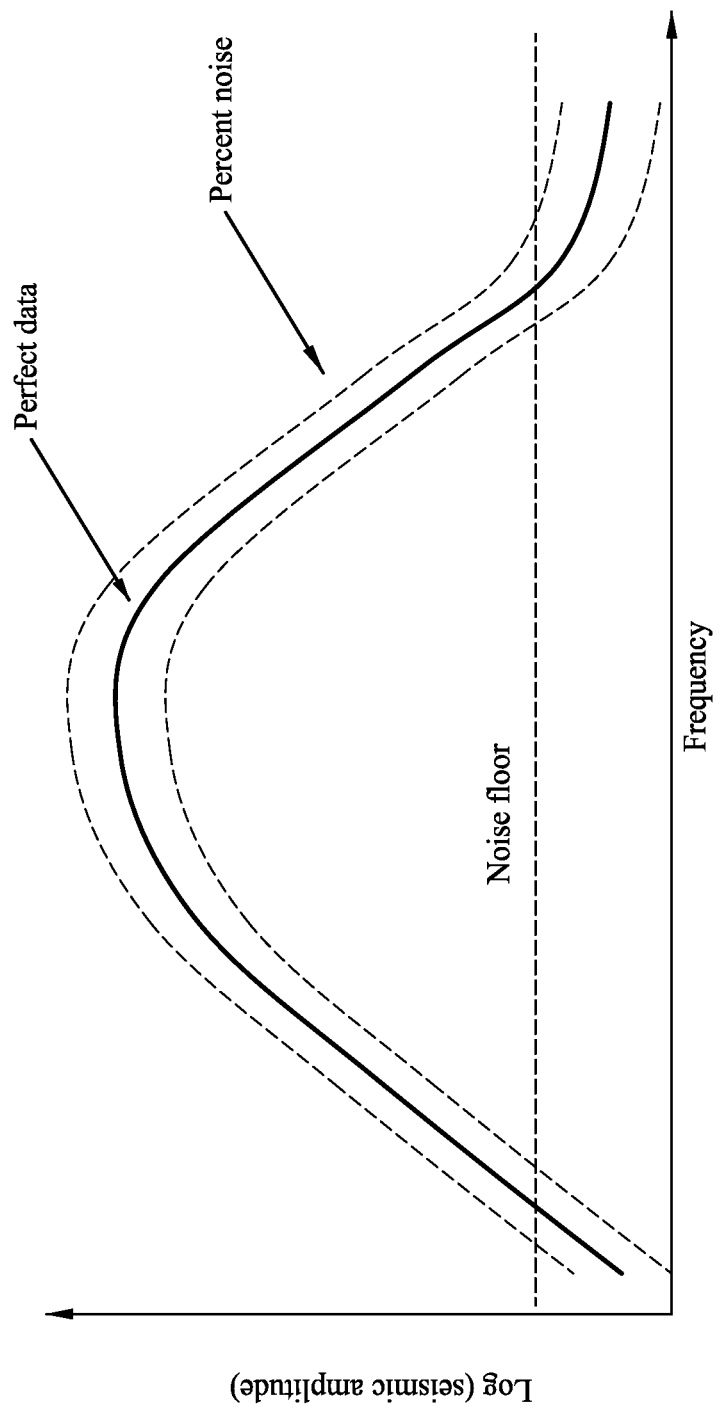
FIG. 3 illustrates synthetic seismic data that is used as input seismic data for an example of estimating reservoir flow properties from seismic data.

An example of estimating reservoir flow properties from seismic data is illustrated in FIGS. 3-6B. FIG. 4B (and schematically in FIG. 3) illustrates synthetic seismic data that is used as the input seismic data for the example. For simplicity, the synthetic seismic data has been limited to zero-offset seismic response; in this particular case an acoustic simulator can be used to obtain the elastic response. The same approach can be applied to non-zero offset data with a full elastic simulator. Note that, at zero (or small) offset, the seismic waves, being vertically incident to contrasts in elastic parameters by layer, are purely compressional. The synthetic seismic data may be generated by either elastic or poroelastic simulation. As can be seen in FIG. 3, synthetic Gaussian-distributed errors will add to the synthetic seismic data in two ways: with standard deviation proportional to the amplitude per frequency (relative noise), and with standard deviation as a constant value per frequency (noise floor). For the purposes of the example, generating the synthetic seismic data provides the seismic data of block 110 in method 100 and/or block 210 in method 200.

As part of the example, many inversions of synthetic seismic data are run (as in blocks 130 or 230). The data simulator used within the inversion is purely elastic. The free parameters in the inversion are compressional velocity, density, and thickness for each layer.

Figure 4A:
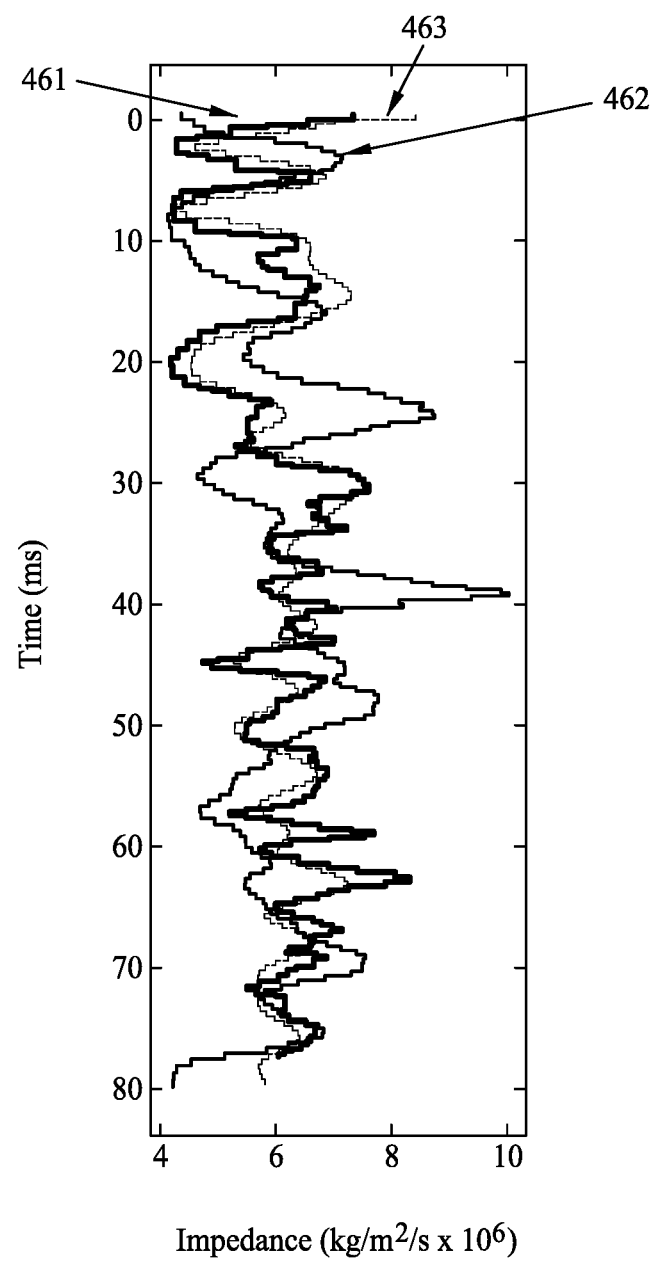
FIG. 4A illustrates layered elastic models from an inversion from the example of FIG. 3. From the same inversion.
Figure 4B:
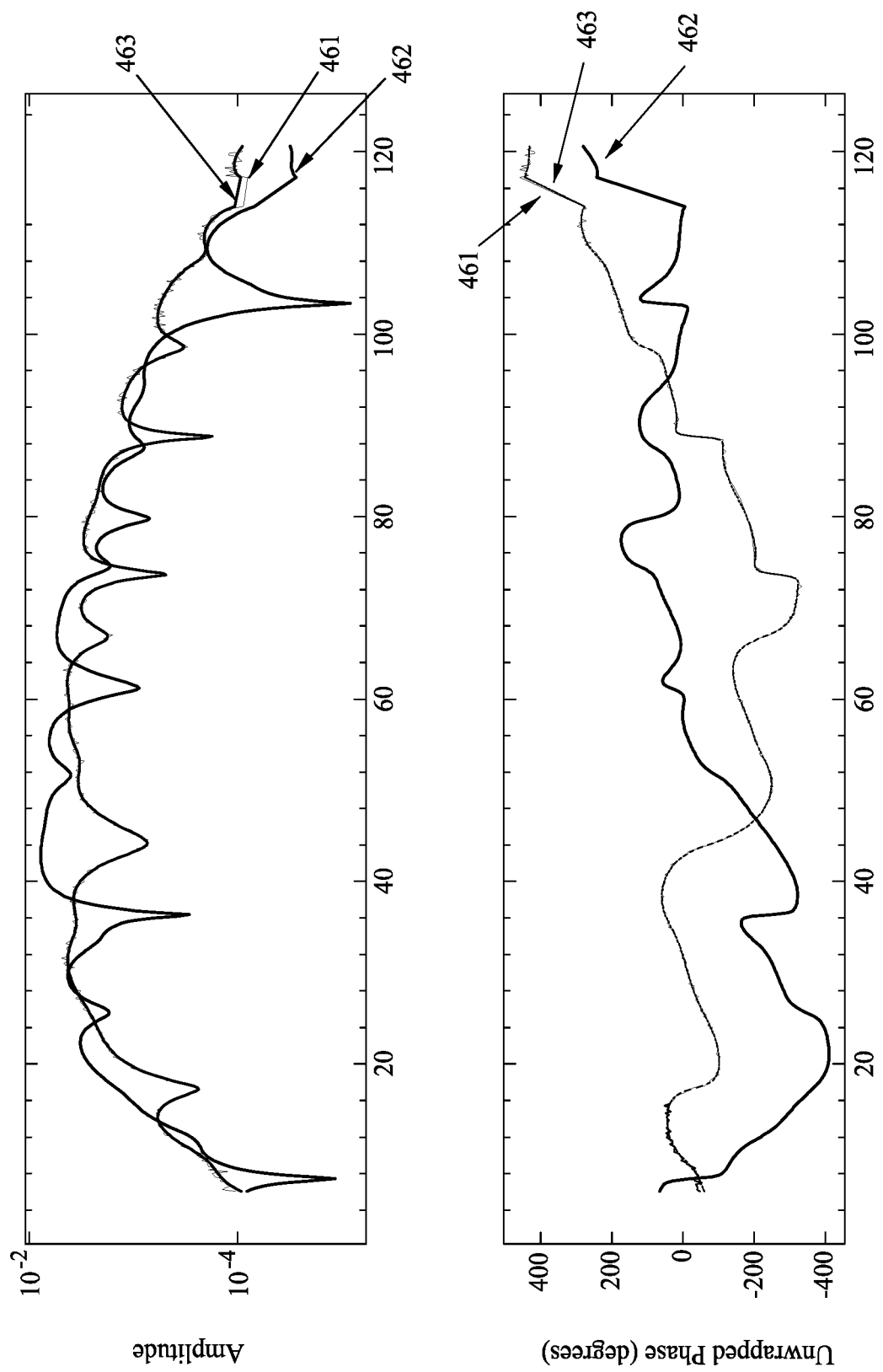
FIG. 4B illustrates the seismic response data as a function of frequency.
Figure 4C:
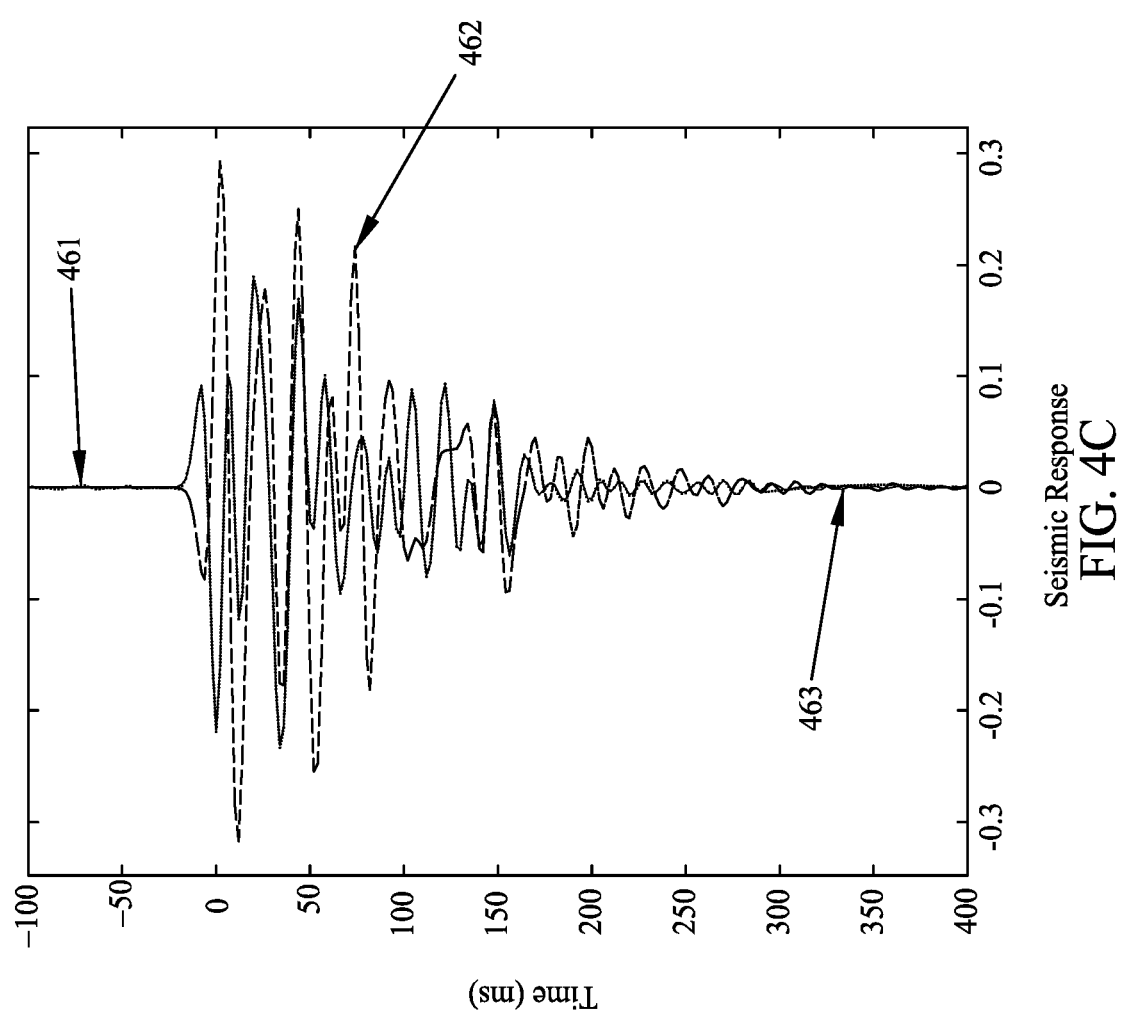
FIG. 4C illustrates the seismic response data as a function of time.
Figure 4D:
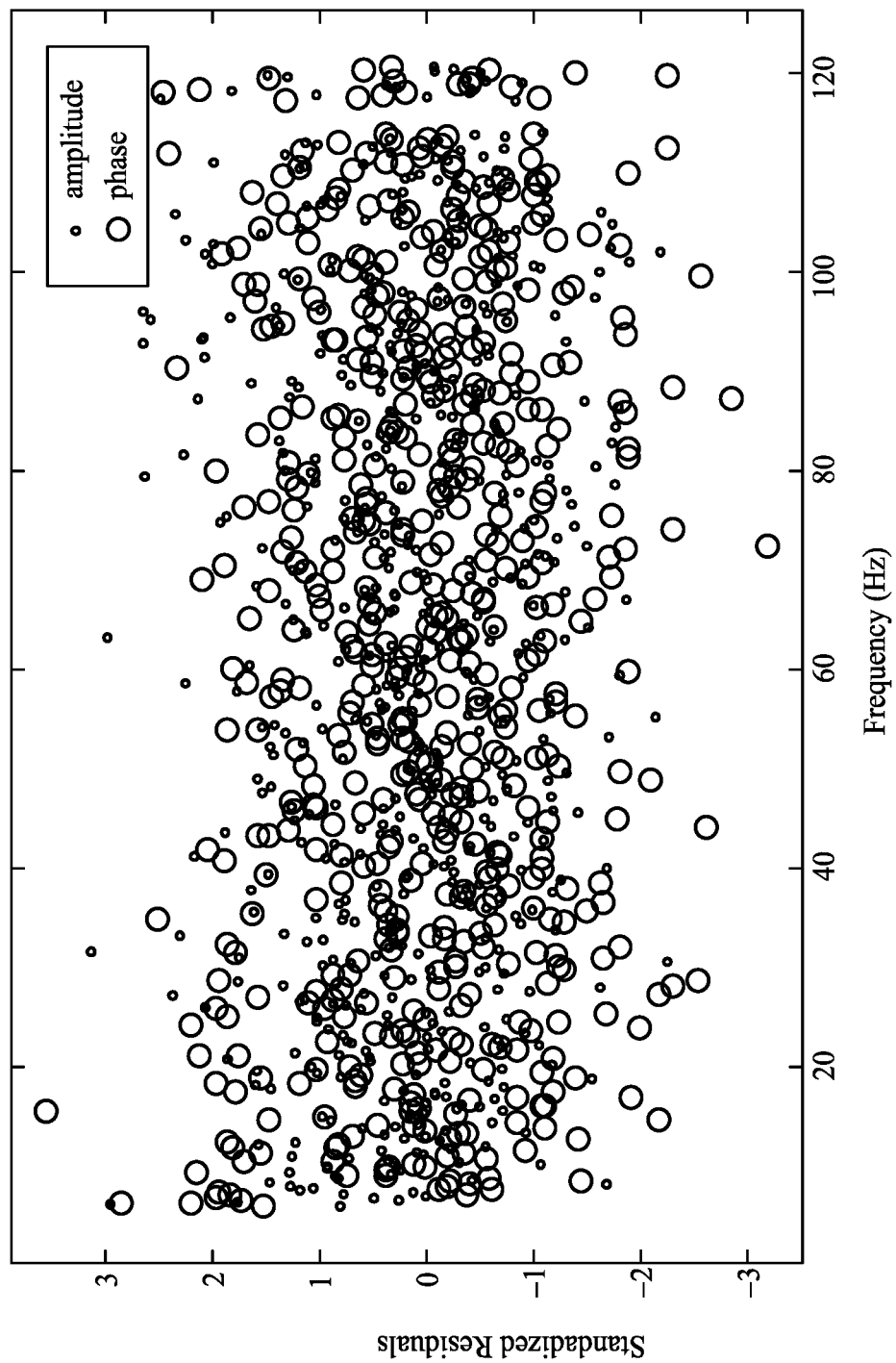
FIG. 4D illustrates residuals from the best-fit model in terms of frequency from the example of FIG. 3.
Figure 4E:
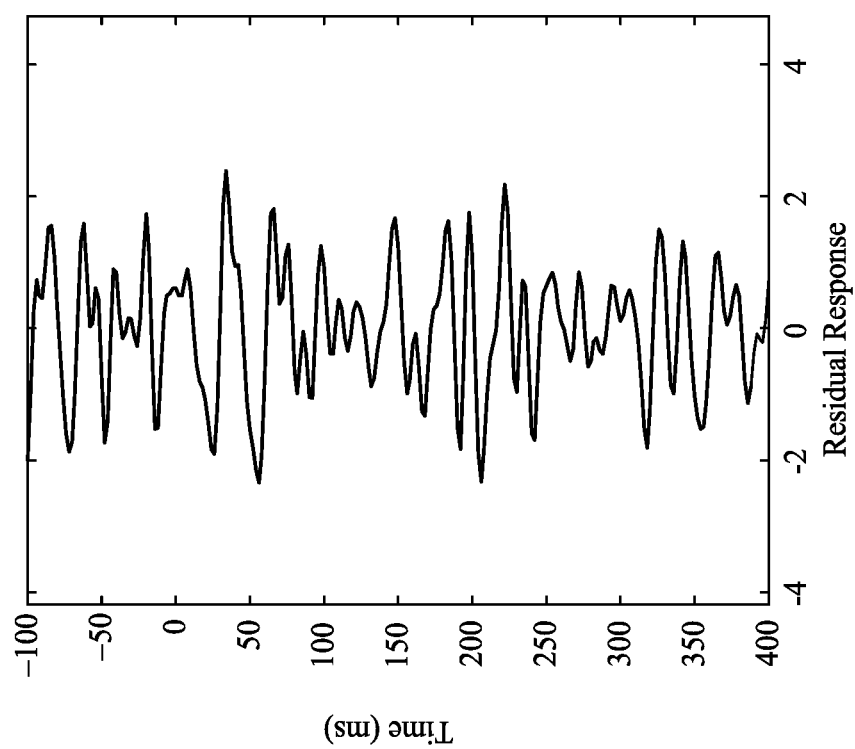
FIG. 4E illustrates the residuals from the best-fit model in terms of time.

FIGS. 4A-E illustrate validation of the efficacy of the elastic inversion method. The synthetic seismic data is inverted. The data simulator used within the inversion is purely elastic; therefore, the inversion is expected to be able to fit the synthetic seismic data down to the noise level. FIG. 4A illustrates the layered elastic models from the inversion. As can be seen, the elastic models are complex sequences of layers, plotted as functions of travel time (as a proxy for depth) and impedance (a product of velocity and density). The solid line 461 shows the true model, which was used to create the synthetic seismic data. The dashed line 462 shows the starting model, which was chosen by smoothing a sequence of random numbers—thus uninformed by the true model. The dotted line 463 shows the best-fit model estimated by the inversion. As can be seen in FIG. 4B, dotted line 463 (the best-fit model) achieves a good fit to the synthetic ("true") seismic model of solid line 461. The misfit between solid line 461 and dotted line 463 matches the provided noise level. Note that the inverted best-fit model is not expected to match the synthetic seismic data due to the non-uniqueness of the inversion. FIG. 4B illustrates the seismic response data as a function of frequency, and FIG. 4C illustrates the seismic response data as a function of time. FIG. 4D illustrates the residuals from the best-fit model in terms of frequency; the residuals have been normalized by the known standard deviation of synthetic noise added to the perfect synthetic data. FIG. 4E illustrates the residuals from the best-fit model in terms of time. The residuals can be seen to be small and random, with no systematic trends.

Figure 5A:
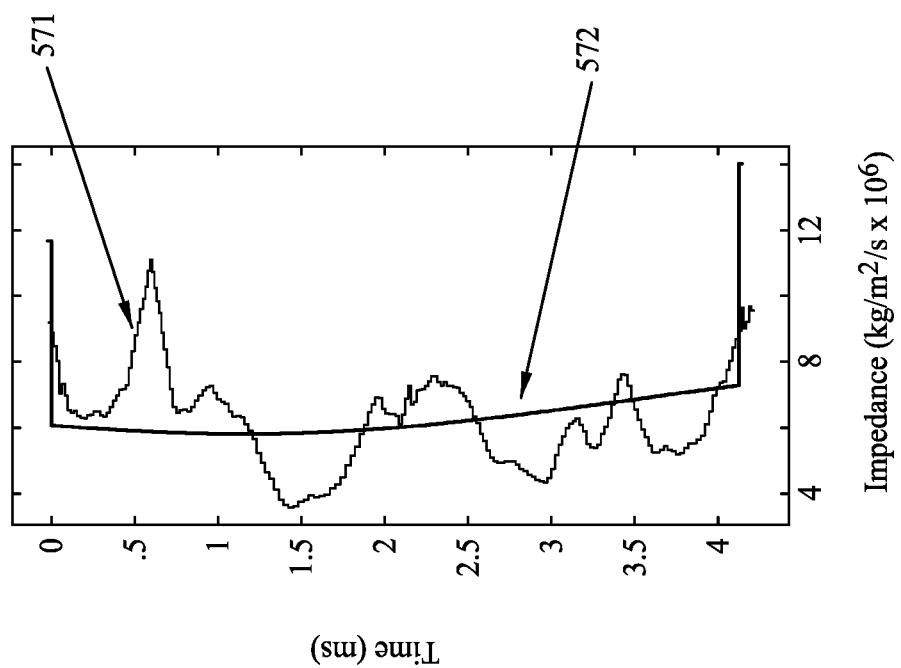
FIGS. 5A-F illustrate results from additional examples of estimating reservoir flow properties from seismic data.
Figure 5B:
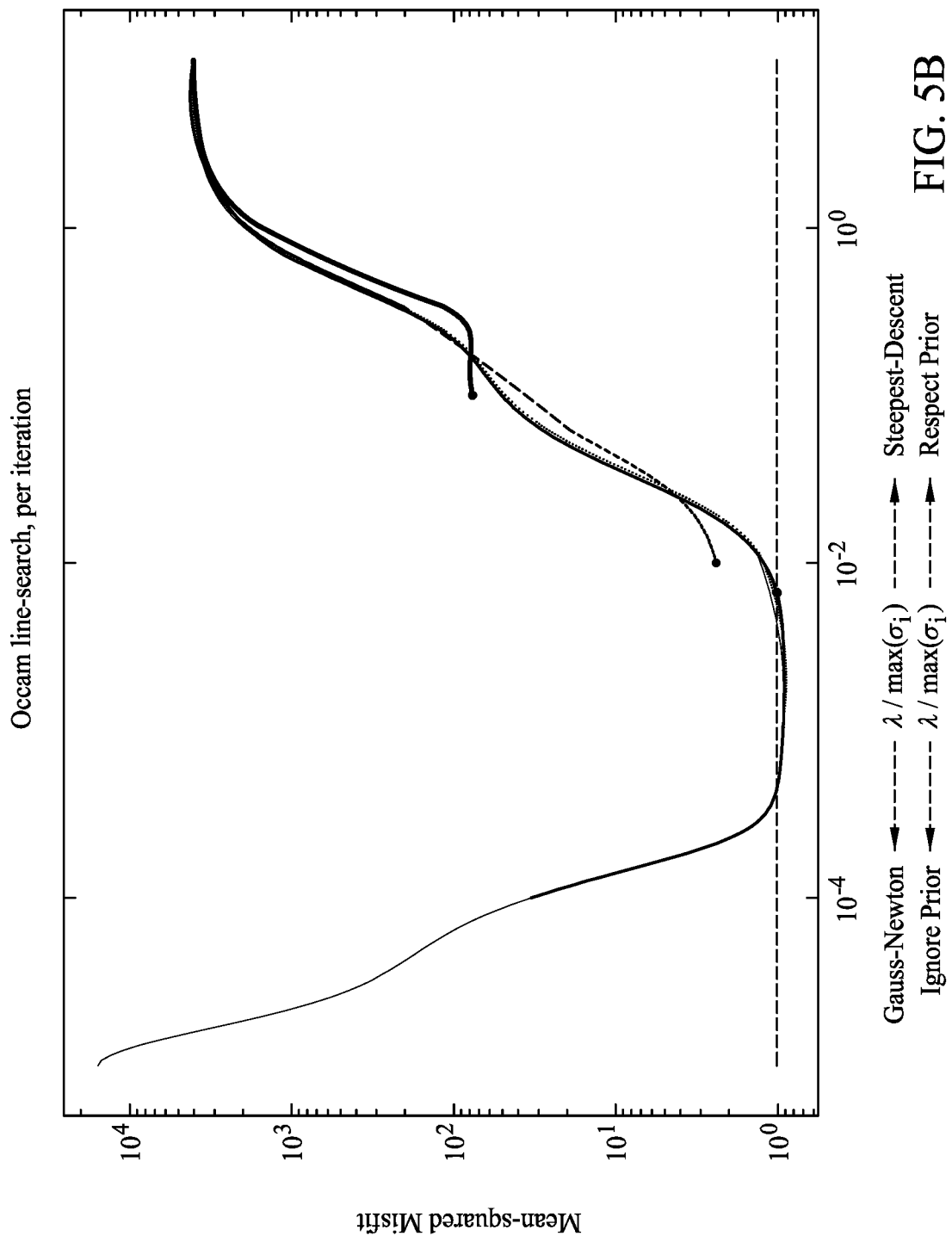
Figure 5C:
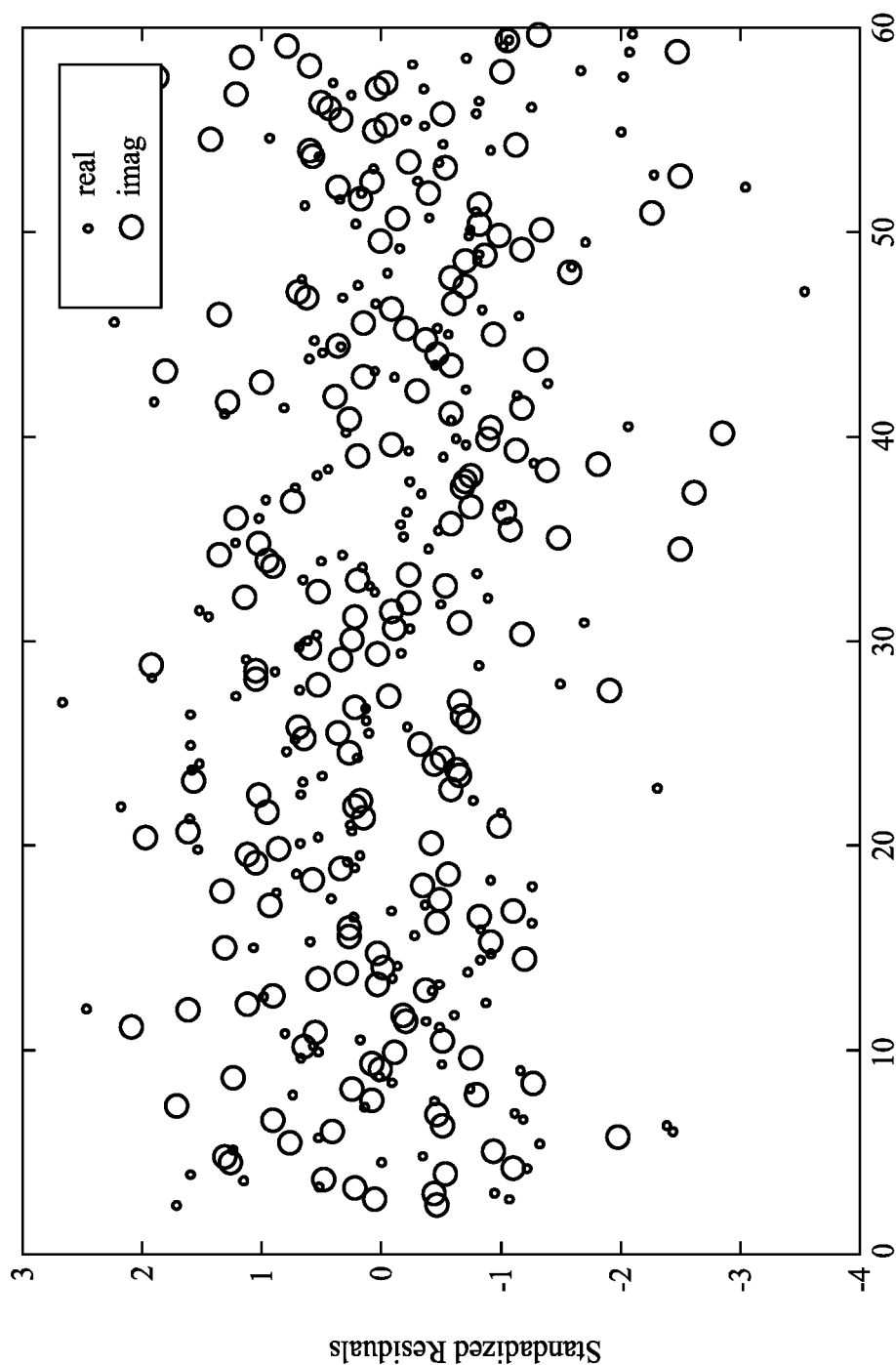
Figure 5D:
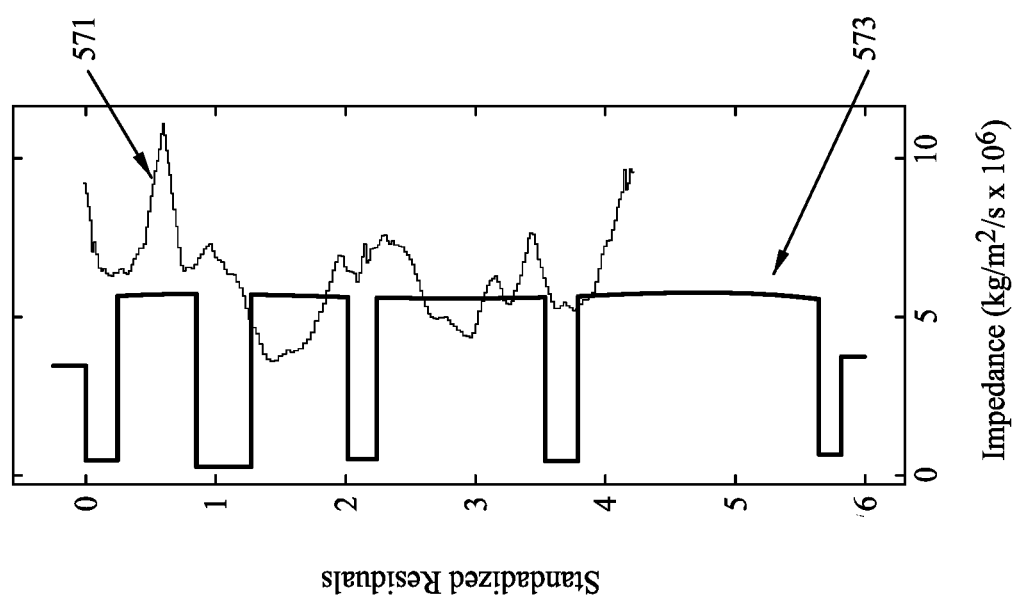
Figure 5E:
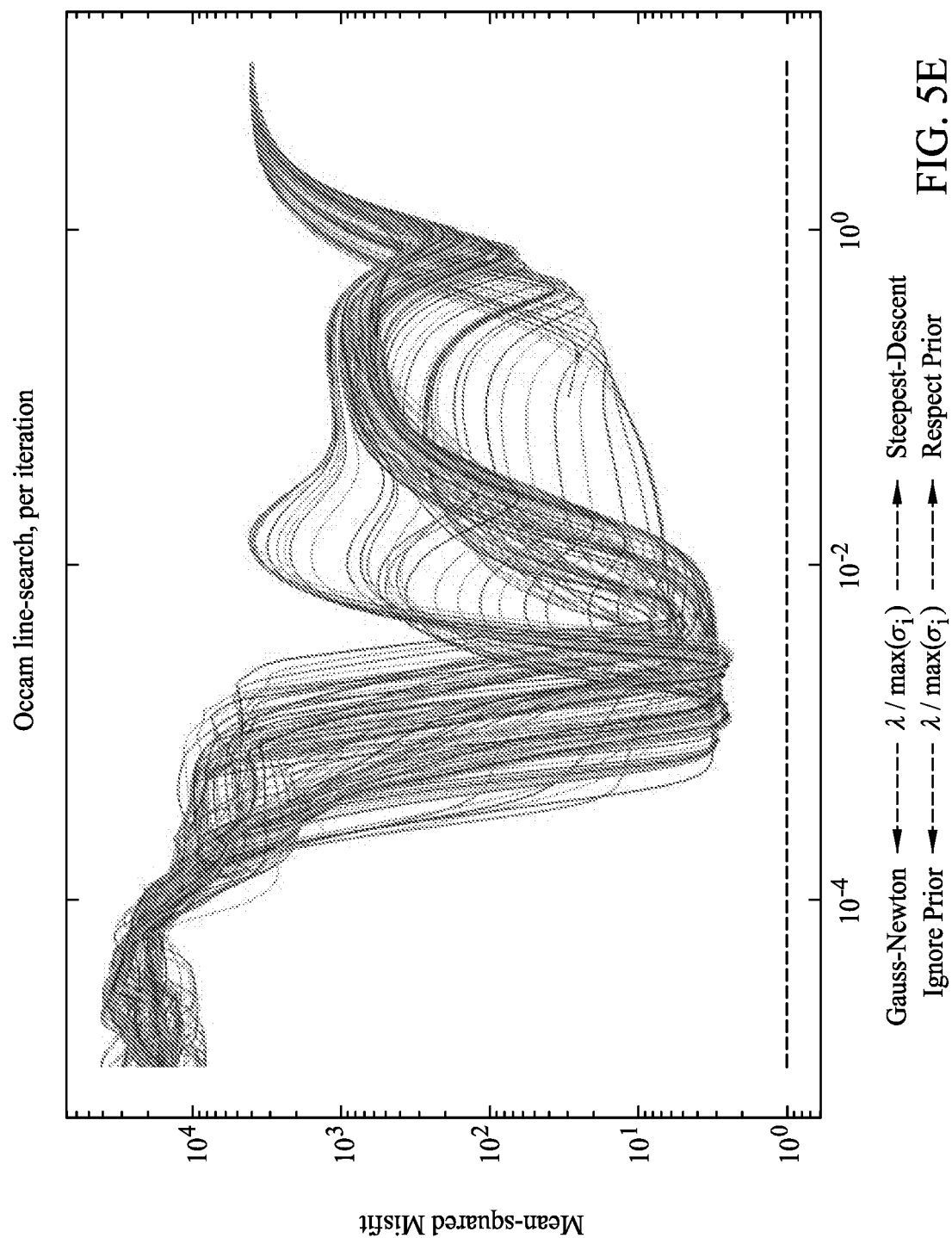
Figure 5F:
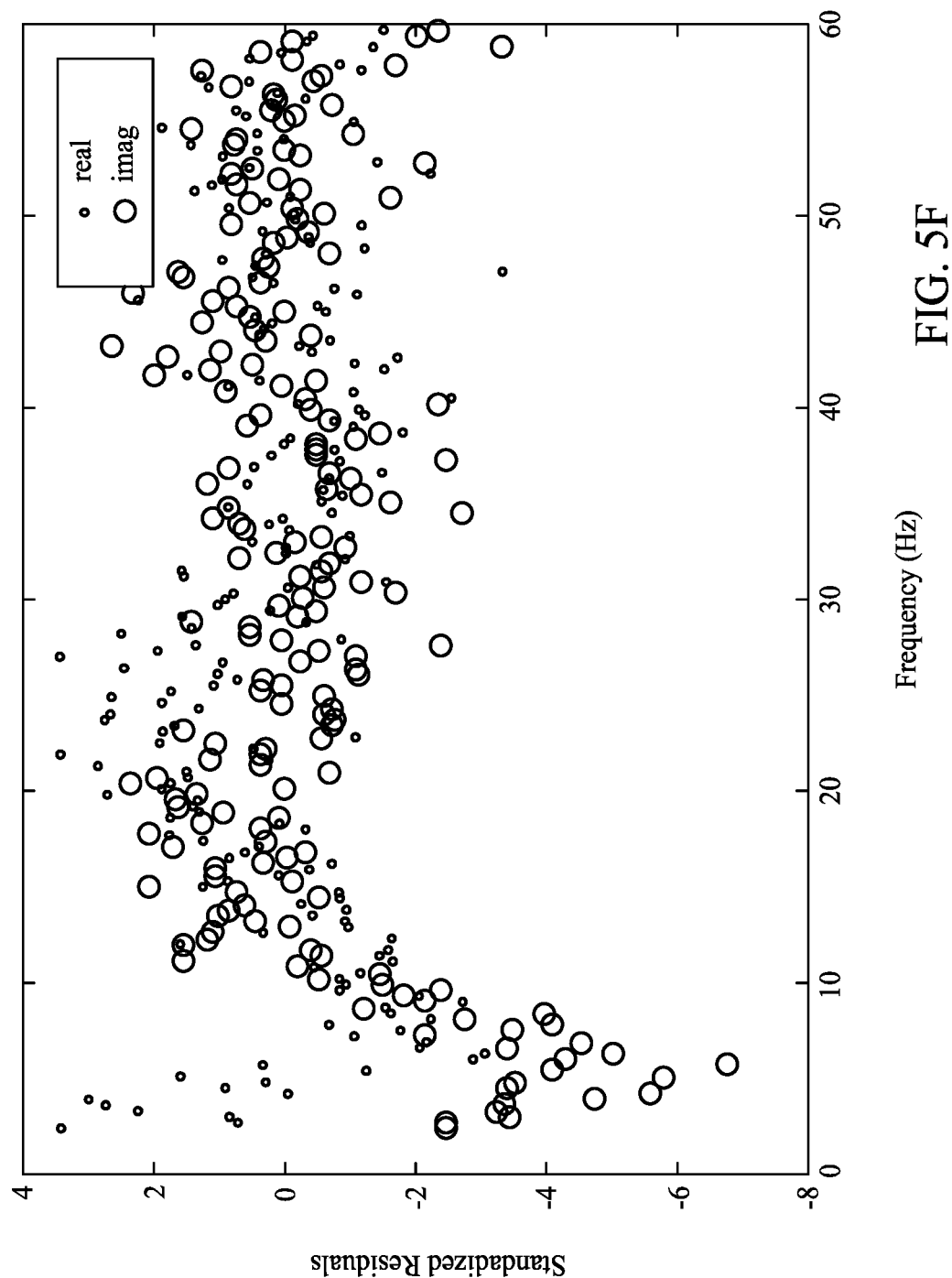

A second example utilizes five different true models with a poroelastic simulator to create synthetic data. The five different models share the same set of elastic parameters for the layers of the models. However, the permeabilities of the layers differ amongst the models, resulting in varying levels of non-elastic behavior. The example then estimates reservoir flow properties from the five sets of seismic data. FIGS. 5A-C illustrate the results for a model which had extremely low permeability (very low or nonexistent fluid flow). FIGS. 5D-F illustrate the results for a model which had a moderate permeability allowing for relative fluid flow. In FIGS. 5A and 5D, line 571 represents a random starting model. Line 572 in FIG. 5A represents the best-fit elastic model from the inversion of data from the very low permeability scenario. Line 573 in FIG. 5D represents the best-fit model from the inversion for the moderate permeability scenario. The inversion of the very low permeability scenario found a purely elastic best-fit model (line 572 of FIG. 5A) which fit the data down to the noise level in a few iterations (as seen in FIG. 5B). The residuals, plotted in FIG. 5C, do not show appreciable trends. Thus, the noise level, the number of iterations, and the residuals all indicate minimal non-elastic effects in the data for this scenario. In comparison, best-fit line 573 (of FIG. 5D) is indicative of non-elastic effects due to poroelasticity (note the disjointed impedance estimates, with interspersed layers of unusually low impedance). Despite many iterations, the inversion could not find an elastic model which could replicate the data down to the noise level (as seen in FIG. 5E). Moreover, the residuals show significant correlative trends across frequencies in FIG. 5F. Note that the poroelastic effect is distinguishable from the elastic response, especially at lower frequencies (e.g., below about 10 Hz). It is currently believed that measurements at even lower frequencies (e.g., between about 0.01 Hz and about 3 Hz) may provide an even stronger discrimination of reservoir flow properties. Thus, the noise level, the number of iterations, and the residuals all indicate substantial non-elastic effects in the data for this scenario.

Figure 6A:
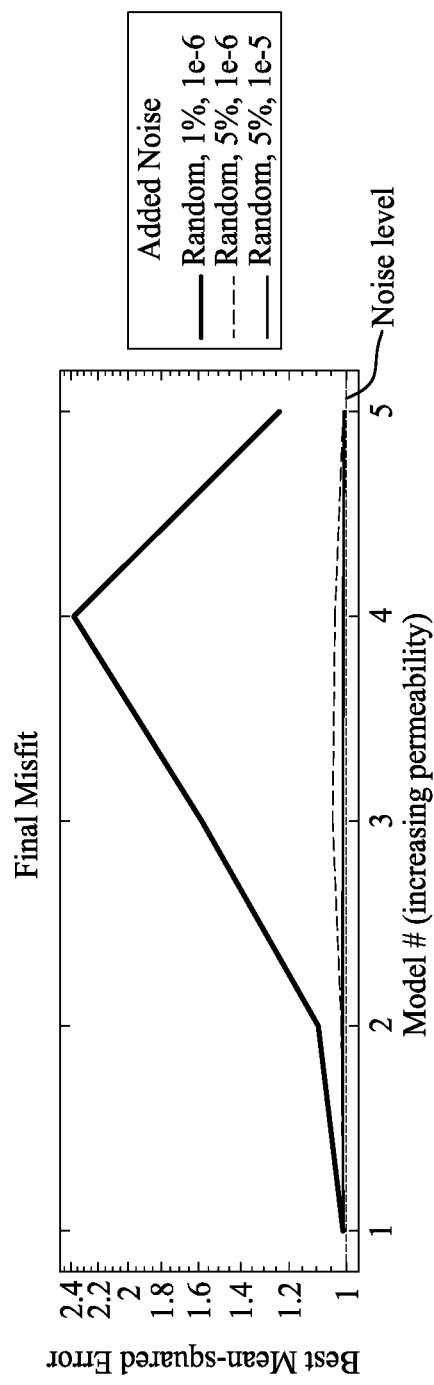
FIG. 6A illustrates the misfit achieved by the best-fitting elastic model for each of five different exemplary poroelastic models.
Figure 6B:
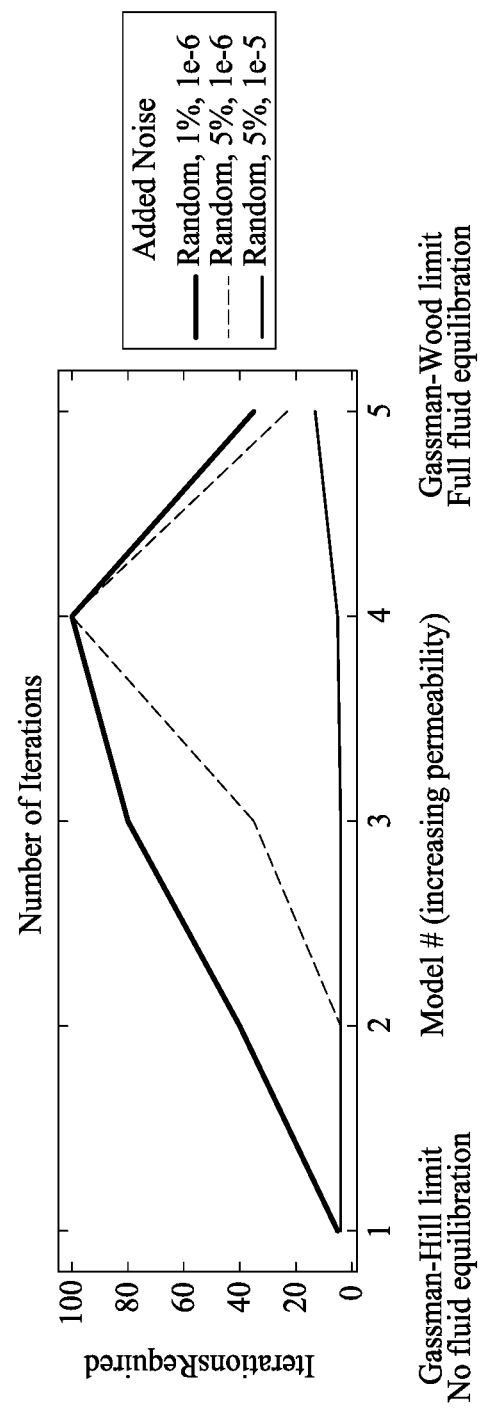
FIG. 6B illustrates the total number of iterations required to find the best-fit model for each of the five different exemplary poroelastic models.

FIGS. 6A-B summarize the inversion results for the five different poroelastic models (scenarios). FIG. 6A shows the misfit (e.g., final root-mean-squared misfit) achieved by the best-fitting elastic model for each scenario. FIG. 6B shows the total number of iterations used to find the best-fit model for each scenario. The five scenarios are ordered from left to right in each figure from very low permeability to very high permeability. In the scenario on the far left (i.e., very low fluid flow), seismic waves do not induce fluid flow, and the seismic response is not modified from purely elastic behavior. In the scenario on the far right (i.e., very high permeability), the seismic waves induce fast-moving relative fluid flow. In fact, the fluid moves so readily that pore pressure equilibrates between adjacent layers, and the seismic response again is not modified from purely elastic behavior. Thus, in the example, only the intermediate permeability scenarios manifest in high misfit levels and/or high numbers of iterations from the elastic inversion. The example demonstrates the feasibility of estimating reservoir flow properties from seismic data.

In practical applications, the present technological advancement may be used in conjunction with a seismic data analysis system (e.g., a high-speed computer) programmed in accordance with the disclosures herein. Preferably, in order to efficiently perform FWI, the seismic data analysis system is a high performance computer ("HPC"), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 7:
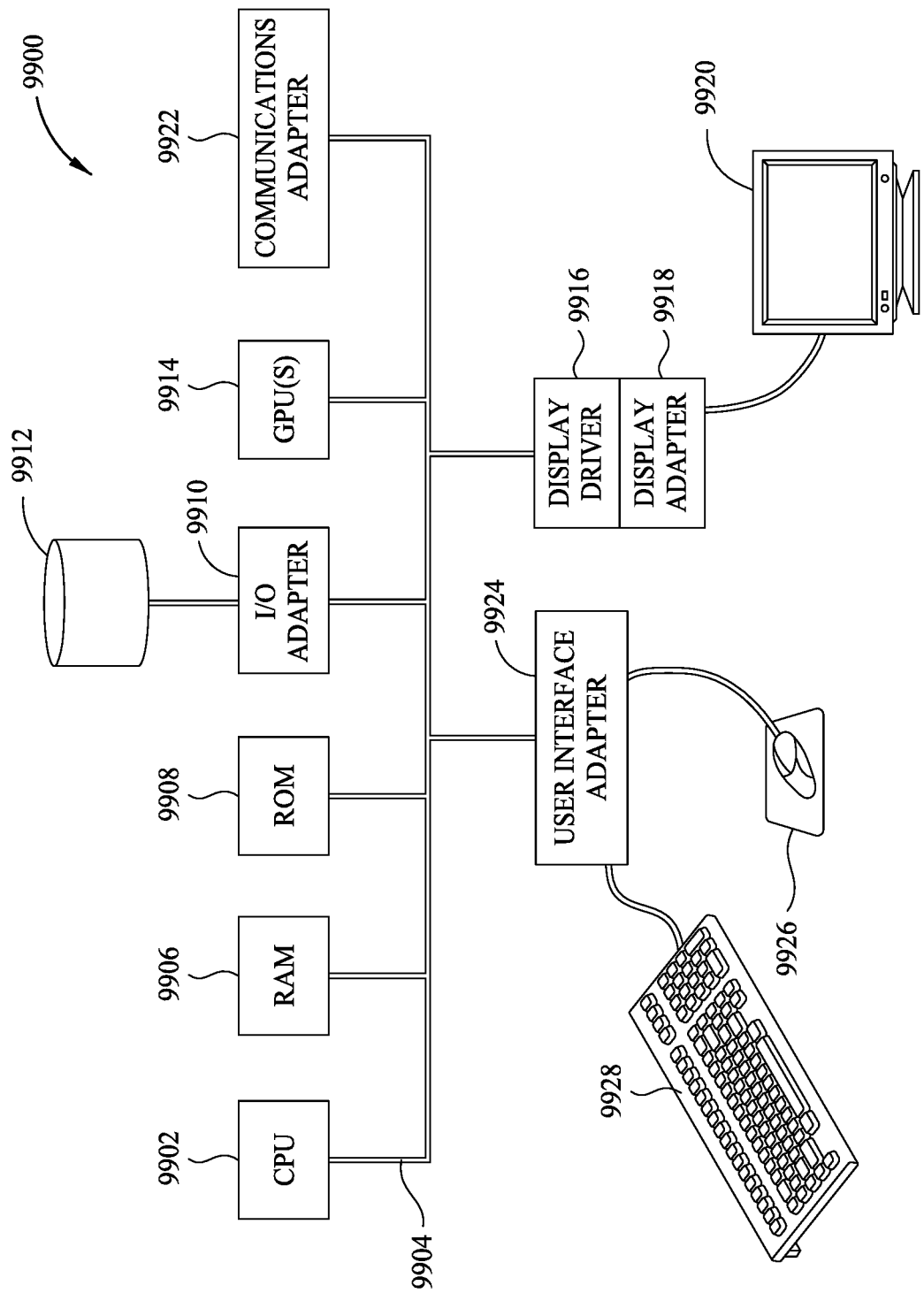
FIG. 7 illustrates a block diagram of a seismic data analysis system upon which the present technological advancement may be embodied.

FIG. 7 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 7, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory ("RAM") 9906, which may be SRAM, DRAM, SDRAM, or the like. The system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc ("CD") drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein (e.g., best-fit elastic model, permeability model, residual plots, subdivision parameters, etc.). As the models themselves are representations of geophysical data, such a display device may also be said more generically to be configured to display graphical representations of a geophysical data set, which geophysical data set may include the models (e.g., best-fit elastic model, permeability model, residual plots, subdivision parameters, etc.) described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits ("ASICs") or very large scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

The above-described techniques, and/or systems implementing such techniques, can further include hydrocarbon management based at least in part upon the above techniques. For instance, methods according to various embodiments may include managing hydrocarbons based at least in part upon models and/or images constructed according to the above-described methods. In particular, such methods may include drilling a well, and/or causing a well to be drilled, based at least in part upon the best-fit elastic model, permeability model, residual plots, and/or subdivision parameters (e.g., such that the well is located based at least in part upon a location determined from the best-fit elastic model, permeability model, residual plots, and/or subdivision parameters, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method of identifying non-elastic indicators for a subsurface region, comprising:
   obtaining seismic data for the subsurface region;
   generating a best-fit elastic model from the seismic data;
   identifying the non-elastic indicators from the seismic data and the best-fit elastic model, wherein the non-elastic indicators comprise residual; and
   estimating reservoir flow properties from the non-elastic indicators based on a poroelastic interpretation of the seismic data, wherein estimating the reservoir flow properties from the non-elastic indicators comprises migrating the residuals.

2. The method of claim 1, wherein the non-elastic indicators comprise at least one of:
   level of misfit between the seismic data and a synthetic seismic response of the best-fit elastic model;
   a number of inversion iterations that run prior to finding the best-fit elastic model;
   parameters of a fitting function; or
   correlation among the level of misfit, the number of inversion iterations, and the parameters of the fitting function.

3. The method of claim 2, wherein the non-elastic indicators comprise the level of misfit between the seismic data and the synthetic seismic response of the best-fit elastic model, wherein the level of misfit is a root-mean-squares of the residuals.

4. The method of claim 3, wherein the level of misfit indicates an amount of wave-induced fluid flow.

5. The method of claim 2, wherein the non-elastic indicators comprise the number of inversion iterations that run prior to finding the best-fit elastic model, wherein the number of inversion iterations indicates a likelihood of wave-induced fluid flow.

6. The method of claim 2, wherein the non-elastic indicators comprise parameters of a fitting function, wherein the parameters of the fitting function comprise at least one of reflectivity coefficient, impedance, elastic velocity, density, or thickness of each layer.

7. The method of claim 1, further comprising:
   subdividing the seismic data into a plurality of subdivisions, wherein:
      the generating the best-fit elastic model from the seismic data comprises generating an individual best-fit elastic model for each subdivision, and
      the identifying non-elastic indicators from the seismic data and the best-fit elastic model comprises identifying individual non-elastic indicators from each subdivision and its respective individual best-fit elastic model.

8. The method of claim 7, wherein each subdivision represents a large number of data points of the seismic data.

9. The method of claim 7, wherein:
   subdividing the seismic data into a plurality of subdivisions comprises:
      subdividing the subsurface region by depth and lateral location;
      identifying a depth and a lateral location for each subdivision;
      identifying a depth and a lateral location for each individual non-elastic indicator based on its respective subdivision; and
      generating a plot that presents the individual non-elastic indicators by each respective depth and lateral location.

10. The method of claim 9, wherein analyzing the individual non-elastic indicators further comprises identifying in the plot at least one of a pattern and a discontinuity.

11. The method of claim 7, wherein the estimating the reservoir flow properties from the non-elastic indicators comprises analyzing the individual non-elastic indicators based on the plurality of subdivisions.

12. The method of claim 1, further comprising managing hydrocarbons based on the estimated reservoir flow properties.

13. The method of claim 1, wherein the reservoir flow properties comprises at least one of:
   absolute permeability;
   relative permeability; and
   entrained fluid viscosity.

14. The method of claim 1, wherein obtaining seismic data comprises conducting a seismic survey to acquire low frequency data.

15. The method of claim 1, wherein generating the best-fit elastic model comprises running an inversion.

16. The method of claim 15, wherein the inversion comprises an inversion techniques that is capable of fitting elastic data to elastic models with a low number of iterations and low residuals.

17. The method of claim 1, further comprising managing hydrocarbons based on the non-elastic indicators.

18. The method of claim 1, wherein the seismic data is generated from models.

19. A method for generating an image of a subsurface region comprising:
obtaining seismic data for the subsurface region;
generating a best-fit elastic model from the seismic data;
identifying non-elastic indicators from the seismic data and the best-fit elastic model, wherein the non-elastic indicators comprise residuals;
estimating reservoir flow properties from the non-elastic indicators based on a poroelastic interpretation of the seismic data, wherein estimating the reservoir flow properties from the non-elastic indicators comprises migrating the residuals; and
generating the image from the non-elastic indicators.

20. The method of claim 19, further comprising:
subdividing the seismic data into a plurality of subdivisions, wherein:
the generating the best-fit elastic model from the seismic data comprises generating an individual best-fit elastic model for each subdivision, and
the identifying non-elastic indicators from the seismic data and the best-fit elastic model comprises identifying individual non-elastic indicators from each subdivision and its respective individual best-fit elastic model.

21. A method of hydrocarbon management comprising:
obtaining seismic data for p subsurface region;
generating a best-fit elastic model from the seismic data;
identifying non-elastic indicators from the seismic data and the best-fit elastic model, wherein the non-elastic indicators comprise residuals;
estimating reservoir flow properties from the non-elastic indicators based on a poroelastic interpretation of the seismic data, wherein estimating the reservoir flow properties from the non-elastic indicators comprises migrating the residuals; and
making a well-placement decision based on the non-elastic indicators.

22. The method of claim 21, further comprising:
subdividing the seismic data into a plurality of subdivisions, wherein:
the generating the best-fit elastic model from the seismic data comprises generating an individual best-fit elastic model for each subdivision, and
the identifying non-elastic indicators from the seismic data and the best-fit elastic model comprises identifying individual non-elastic indicators from each subdivision and its respective individual best-fit elastic model.

23. A geophysical data analysis system comprising:
a processor; and
a display configured to display graphical representations of a geophysical data set,
wherein the processor is configured to:
obtain seismic data for a subsurface region;
generate a best-fit elastic model from the seismic data; and
identify non-elastic indicators from the seismic data and the best-fit elastic model, wherein the non-elastic indicators comprise residuals; and
estimate reservoir flow properties from the non-elastic indicators based on a poroelastic interpretation of the seismic data by migrating the residuals.

24. The geophysical data analysis system of claim 23, wherein the geophysical data analysis system is further configured to:
subdivide the seismic data into a plurality of subdivisions, comprising:
generating the best-fit elastic model from the seismic data by generating an individual best-fit elastic model for each subdivision, and
identifying non-elastic indicators from the seismic data and the best-fit elastic model by identifying individual non-elastic indicators from each subdivision and its respective individual best-fit elastic model.

* * * * *